United States Patent Office 2,804,465
Patented Aug. 27, 1957

2,804,465

1-(4-HYDROXY COUMARINYL-3)-1-(2-HYDROXY CHROMONYL-3)-2-(S-ALKYL THIO) - ETHANS AND METHOD OF PRODUCING SAME

Karel Fučík, Tocna-Komorany, and Jaroslav Šarhan, Prague, Czechoslovakia, assignors to Spofa Spojené farmaceutické Zárody, Národní podnik, Prague, Czechoslovakia No Drawing. Application February 7, 1955,
Serial No. 486,728

Claims priority, application Czechoslovakia
February 4, 1954

2 Claims. (Cl. 260—343.2)

It has been found, that alkyl mercapto-acetals of the general formula

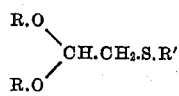

where R and R' are alkyl groups, may be easily condensed with 4-hydroxy coumarin to products having probably the following structure:

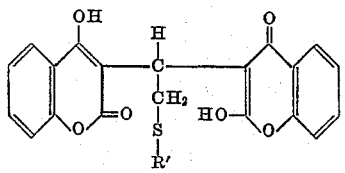

The alkyl mercapto-acetals of the above indicated formula may be prepared by condensation of a halogen acetal with an alkaline metal mercaptide, e. g. sodium mercaptide, in alcoholic solution heated to its boiling point or heated in a closed vessel at increased pressure. These alkyl mercapto-acetals have not been described hitherto; only their oxygen analogues are known (G. Nadeau and R. Gaudry, Can. J. Res., 27B, 421, 1949).

Instead of alkyl mercapto-acetals, their obvious equivalents may be used accordingly, e. g. alkyl mercapto-semi-acetals or alkyl mercapto-aldehydes (or their bisulphite compounds) respectively. Acetals, however, are usually most convenient.

The condensation of alkyl mercapto-acetals with 4-hydroxy coumarin may be advantageously carried out in an aqueous medium in presence of inorganic acids. In order to reduce the volume of the reaction mixture, it is possible to carry out the condensation in diluted acetic acid solution.

The condensation products of alkyl mercapto-acetals with 4-hydroxy coumarin possess high anti-coagulant activity, which begins quickly and ceases quickly, this feature being advantageous in human therapy.

Example I 70 grams of sodium methyl mercaptide and 152.5 grams of monochloracetal in ethanolic (or methanolic) solution are heated under reflux to the boiling point of the solvent. Precipitated sodium chloride is removed by filtration and the filtrate freed from alcohol by distillation. The oily top layer is separated and purified by rectification. The boiling point of the methyl mercapto-acetal thus obtained is 191° C. under atmospheric pressure or 76° C. under pressure of 11 mm. Hg. The yield is 90–95% of the theory.

1.7 grams of said methyl mercapto-diethylacetal are added to a boiling solution of 3.2 grams of 4-hydroxy coumarin in 350 cc. of water, 1 cc. of concentrated hydrochloric acid is added simultaneously. The precipitated oily product solidifies by cooling. It is sucked off and recrystallized from diluted acetic acid (1:4). The yield is 2.7 grams. The product possesses the formula shown above, where R' is a methyl radical. The melting point of the condensation product is 158° C. The product is 1-(4-hydroxy coumarinyl-3)-1-(chromonyl-3)-2-(S-methyl thio) ethan.

Example II 3.2 grams of 4-hydroxy coumarin are dissolved in 50 cc. of boiling diluted acetic acid (1:4); to this boiling solution 1.7 grams of methyl mercapto-diethyl acetal are added. The reaction mixture is then treated in the same way as in Example I. The product, identical with the product gained according to Example I, is obtained in a yield of 2.8 grams.

We claim:

1. 1-(4-hydroxy coumarinyl-3)-1-(2 - hydroxy chromonyl-3)-2-(S-methyl thio)-ethan, having a melting point of about 158° C.

2. Method of producing 1-(4-hydroxy coumarinyl-3)-1-(2-hydroxy chromonyl-3)-2-(S-methyl thio) - ethan, comprising condensing 4-hydroxy coumarin with methyl mercapto acetal.

References Cited in the file of this patent
UNITED STATES PATENTS
2,482,511    Rosicky _____ Sept. 20, 1949